US012613537B1

(12) United States Patent
Brink

(10) Patent No.: US 12,613,537 B1
(45) Date of Patent: Apr. 28, 2026

(54) SYSTEM FOR SYNTHETIC APERTURE FOR COOPERATIVE NAVIGATION

(71) Applicant: Government of the United States as represented by the Secretary of the Air Force, Wright-Patterson AFB, OH (US)

(72) Inventor: Kevin Brink, Fort Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 57 days.

(21) Appl. No.: 18/610,328

(22) Filed: Mar. 20, 2024

Related U.S. Application Data

(60) Provisional application No. 63/494,350, filed on Apr. 5, 2023.

(51) Int. Cl.
| | |
|---|---|
| *G05D 1/69* | (2024.01) |
| *G05D 1/245* | (2024.01) |
| *G05D 1/247* | (2024.01) |

(52) U.S. Cl.
CPC .............. *G05D 1/69* (2024.01); *G05D 1/245* (2024.01); *G05D 1/247* (2024.01)

(58) Field of Classification Search
CPC ........... G05D 1/69; G05D 1/247; G05D 1/245
USPC .......................................................... 701/24
See application file for complete search history.

(56) References Cited

U.S. PATENT DOCUMENTS

| | | | |
|---|---|---|---|
| 9,798,329 B2 | 10/2017 | Shattil | |
| 10,107,627 B2 | 10/2018 | Aboutalib et al. | |
| 2012/0121161 A1* | 5/2012 | Eade ..................... | G06F 16/444 901/1 |
| 2020/0191529 A1* | 6/2020 | Holder .................. | G01S 13/883 |
| 2020/0371530 A1* | 11/2020 | Anderson ............ | G05D 1/0274 |
| 2021/0033750 A1* | 2/2021 | Lentz ................... | G02B 23/105 |
| 2021/0063200 A1* | 3/2021 | Kroepfl .................. | G06N 3/02 |
| 2021/0318120 A1* | 10/2021 | Lentz ................... | G01C 21/025 |
| 2021/0319568 A1* | 10/2021 | Ellingson ................ | G08G 5/55 |

OTHER PUBLICATIONS

Gary Ellingson et al., entitled "Relative navigation of fixed-wing aircraft in GPS-denied environments", Navigation-US. 2020; 67:255-273. https://doi.org/10.1002/navi.364.

* cited by examiner

*Primary Examiner* — Yazan A Soofi

(74) *Attorney, Agent, or Firm* — AFMCLO/JAZ; Matthew D. Fair

(57) ABSTRACT

Navigation filters/estimators are coupled with coordinated multi-agent batch navigation to facilitate "Synthetic Aperture" capabilities for improved GPS-denied or degraded navigation. The modified single-agent navigation filter continues to estimate platform (Airborne, water based and/or land based autonomous vehicles) position, velocity, and attitude in a global reference frame in the standard way, but now simultaneously outputs "delta-poses" (effectively a low rate odometry) with accurate covariances. The delta-poses are then used in complementary multi-platform navigation algorithms which provides accurate relative pose between cooperating platforms. The relative position knowledge allows the modified global filter to ingest the other platforms navigation-aiding measurements directly.

15 Claims, 4 Drawing Sheets

SYSTEM FOR SYNTHETIC APERTURE FOR COOPERATIVE NAVIGATION

Pursuant to 37 C.F.R. § 1.78(a)(4), this application claims the benefit of and priority to prior filed Provisional Application Ser. No. 63/494,350, filed Apr. 5, 2023, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to methods and systems for improving GPS-denied navigation for terrestrial vehicles, watercraft and aircraft.

BACKGROUND

In recent years, unmanned aircraft systems ("UAS") (a.k.a. "unmanned aerial vehicles," "UAVs," "drones," etc.), watercraft drones and autonomous automotive vehicles have been used in a wide array of military and civilian applications. One difficulty that has been encountered is navigation of autonomous vehicles where absolute location information (e.g., GPS) is unavailable, partially unavailable, or degraded.

There have been many differing concepts considered for cooperative navigation in the past. Some of these approaches have been implemented as an Extended Kalman Filter (EKF), or a particle filter, or in a batch optimization. Some of these concepts attempt to share all the information each agent generates, which will not scale to real-world applications, while others share a marginalized subset of their overall data but to a centralized processor. Regardless of the exact approach and implementation, these approaches typically fail to provide accurate and scalable cooperative navigation required for guidance and control of certain autonomous drones. An improved system and method for navigation of GPS-denied or GPS-degraded environment is needed.

SUMMARY

One embodiment of the present disclosure includes a unique system and method to improve GPS denied or degraded navigation for cooperating autonomous vehicles. Other embodiments include apparatuses, systems, devices, hardware, methods, and combinations wherein a navigation filter or estimator is coupled and coordinated with multi-agent batched optimization to provide a synthetic aperture for improved GPS-denied navigation. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
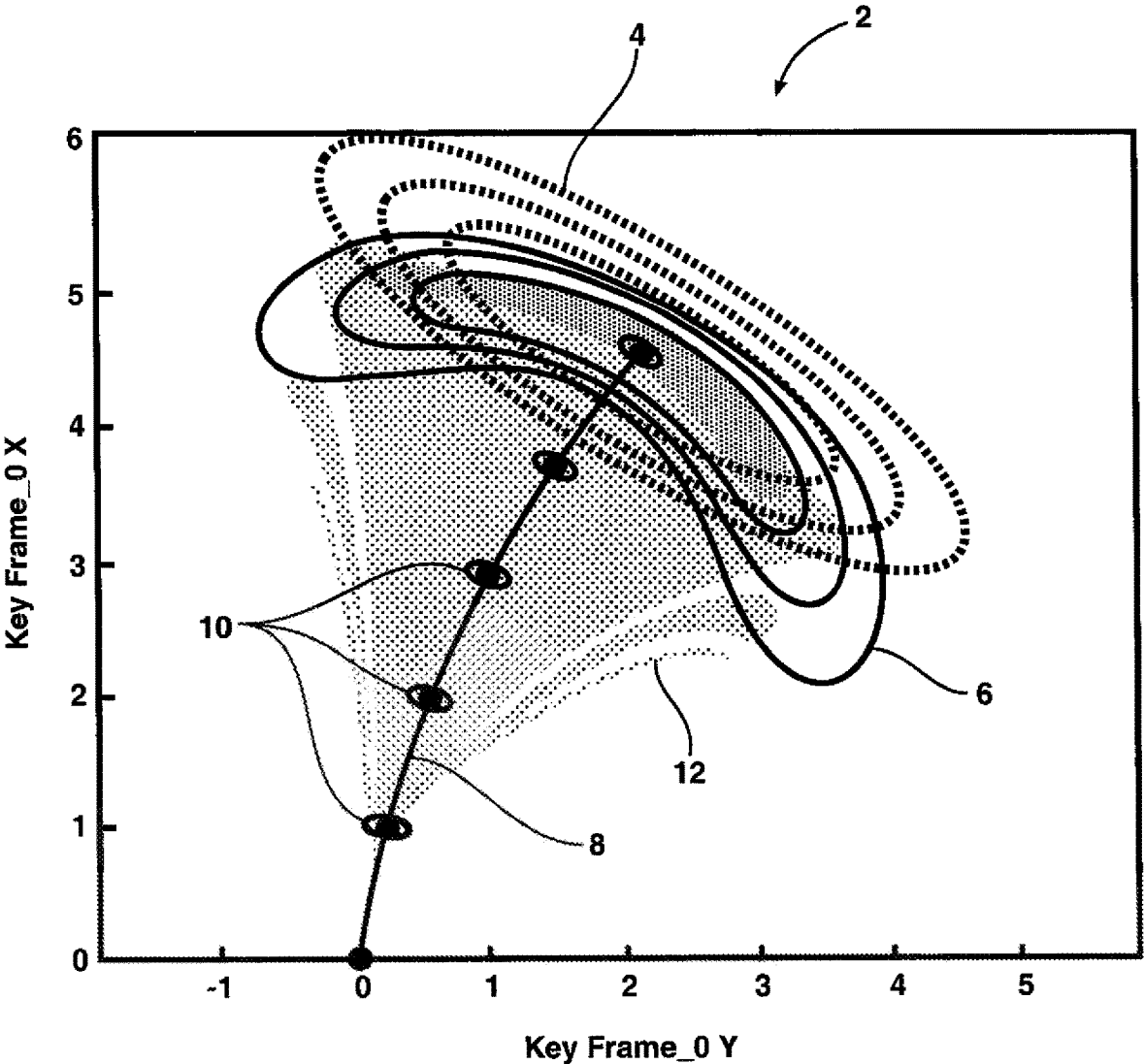
FIG. 1 is a schematic illustration of concatenating delta pose measurements over time and the resulting uncertainty.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is a significant modification of "classic" navigation filters/estimators coupled with coordinated multi-agent batch navigation to facilitate "Synthetic Aperture" capabilities for improved GPS-denied or degraded navigation. The disclosed concept can be separated into three parts, all of which, when combined allow several cooperating vehicles, that have an ability to receive communication including occasional ranging measurements between pairs of vehicles, to share a limited amount of data across the communication network to solve for the relative and global navigation states of the participating vehicles. It should be noted that the terms vehicle and agent may be used interchangeably throughout this disclosure.

Features of the invention include a modified global filter which estimates position, velocity, attitude, other states as needed, and produces delta-poses with covariance, i.e., estimates of, and uncertainty for, the change in position and attitude since a prior "keyframe" location. The coordination required between vehicles to facilitate delta-pose keyframe resets, general data-sharing, and multi-vehicle batch optimizations. The new measurement update process allowing the global (single-agent) navigation filter to ingest the aiding measurements taken by cooperating platforms.

The methods and systems disclosed herein support collaborative navigation in communication constrained environments, both when bandwidth is limited and when systems may experience prolonged communication dropouts or agent attrition. The cooperative navigation disclosed herein can be used with airborne vehicles such as manned aircraft and unmanned aircraft such as drones or weapon systems, but can also be used for autonomous navigation of land based vehicles and water based vehicles such as cars, trucks, boats and submarines or heterogeneous combinations of platforms.

The first component modifies the navigation system of individual vehicles, which typically estimates the position, velocity, attitude (PVA), and any additional states needed to accurately estimate the PVA. The primary modification includes an addition of delta-pose estimates to the output of the navigation system. Typically, PVA is tracked relative to a global frame (latitude, longitude, attitude), or a local positioning frame of reference. The delta-pose measurements effectively measure motion with respect to a vehicle defined local reference frame.

By way of example and not limitation, a reset of the local reference frame, or keyframe, can be set to wherever the vehicle is at the start of any new 10 second time-period. The initial local origin or keyframe is defined when the vehicle is at t=0 (time at 0 seconds), with the vehicle located at zero position with zero attitude, by definitions, and can be done completely independent of the global PVA values. Over the next 10 seconds, the filter updates the PVA in the standard "global" frame and it may also estimate at least one of the position, attitude, and velocity with respect to the most recent keyframe (typically position and heading, at a minimum). At t=10 (time at 10 seconds), the filter will publish estimates of vehicle movement over the previous 10 second period represented in the frame provided by keyframe 0, i.e., its position and attitude in the keyframe established at t=0, along with the covariance for that "delta-pose." Then the filter sets a new keyframe at the current location (position is zero, attitude is zero). The motion of the vehicle is then tracked between t=10 and t=20 with respect to the new keyframe. As a third keyframe is set, the associated delta-pose and covariance with respect to the second keyframe is published, and so on. As this process continues, the resulting delta-poses and covariances can be combined to represent the estimated motion of the vehicle and its path uncertainty over time.

Referring now to FIG. 1, The delta-pose measurements are a compact representation of motion over time and can be easily shared between cooperating vehicles in a space 2 defined by a local keyframe origin. The schematic representation shows a sequence of delta pose measurements along an exemplary motion curve generated by concatenating the sequential deltas 8. Each delta pose has an associated uncertainty 10, and when the delta poses are concatenated, they produce an accumulated uncertainty that can be represented in a Euclidian frame 4 or more accurately using exponential or other representations 6. Individual data points (samples) 12 show a distribution of the possible paths and result in the average, estimated path and path uncertainty represented by frame 4 and frame 6.

If, following the above example, vehicles occasionally range between pairs of agents as the key frame resets occur, the cooperating group can share the delta-pose measurements of each vehicle as well as range measurements that link the poses of differing vehicles. This data can be used to solve the relative position of each vehicle relative to current or past poses/key frames of other vehicles. Using this process, a first vehicle has an estimate of a second vehicle's location relative to the first vehicle's current location along with an uncertainty on that "relative pose," or lever arm between the two positions.

If the second vehicle gets a GPS measurement, or other globally meaningful input (e.g. absolute location not with respect to the local key frames), the first vehicle can now use the estimate of where the second vehicle was when the GPS input was received so that the first vehicle can also use that measurement to update its own global estimate within its primary navigation filter.

Effectively, the process modifies a normal navigation filter/estimator to output delta-poses, share data and solve the relative position problem between vehicles, and then use that relative positioning knowledge for a range of coordinated guidance and control behaviors, but also to distribute any globally relevant navigation data across the group so that all vehicles can update their individual navigation estimates, and allow the entire collaborative group to benefit from any one vehicle receiving navigation input or aiding.

In summary, the modified single-agent navigation filter continues to estimate platform (airborne, water based and/or land based autonomous vehicles) position, velocity, and attitude in a global reference frame in the standard way, but now simultaneously outputs "delta-poses" (effectively a low rate odometry) with accurate covariances. The delta-poses are then used in complementary multi-platform navigation algorithms which provides accurate relative pose estimates and covariances between the cooperating platforms. The relative position knowledge can then be used to allow the modified global filter to ingest the other platforms navigation-aiding measurements directly. The combined system includes: 1) the modification of the global filter to produce delta-poses; 2) the new coordination required between platforms to coordinate delta-pose resets, data-sharing, and multi-platform batch optimization used to solve the relative positions; and 3) the new measurement update process allowing the global single-agent navigation filter to ingest the aiding measurements of cooperating platforms.

Figure 2:
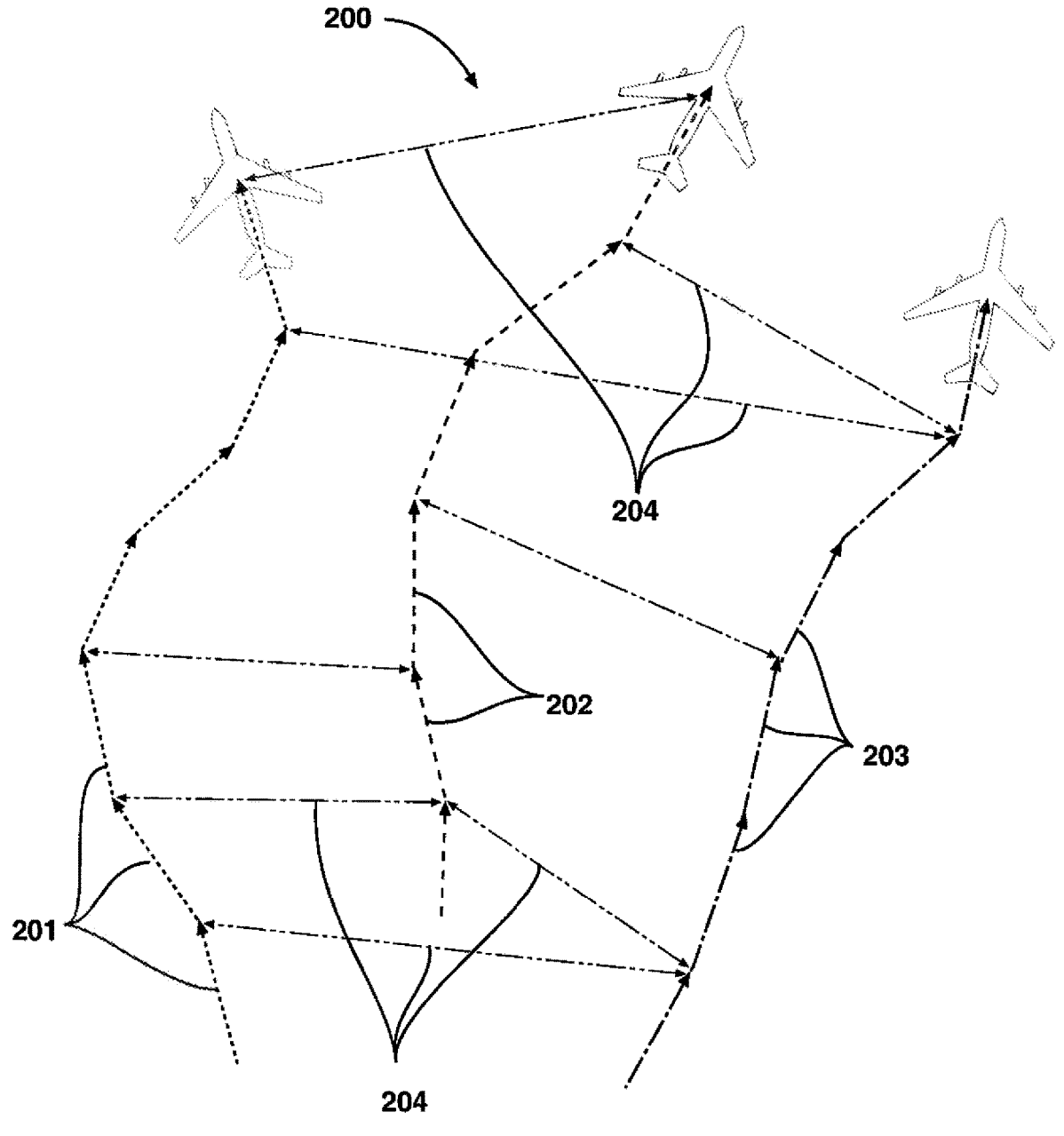
FIG. 2 is a schematic illustration of a cooperative back-end graph with a sequence of delta pose factors between poses for three vehicles, with occasional range factors between pairs of vehicle poses.

FIG. 2 is a schematic illustration is a cooperative backend graph with range factors between vehicle poses 200. Vehicles 1, 2, and 3, have a sequence of delta poses (and covariance values) 201, 202, and 203, respectively and the poses that the concatenation generates. Additionally, occasional range factors 204 connect poses of the different vehicles. A pose graph optimization can then be used to optimize the pose values of each plane to best fit the delta pose and range factor data, and provide estimates of the relative position between any pair of poses in the factor graph.

Figure 3:
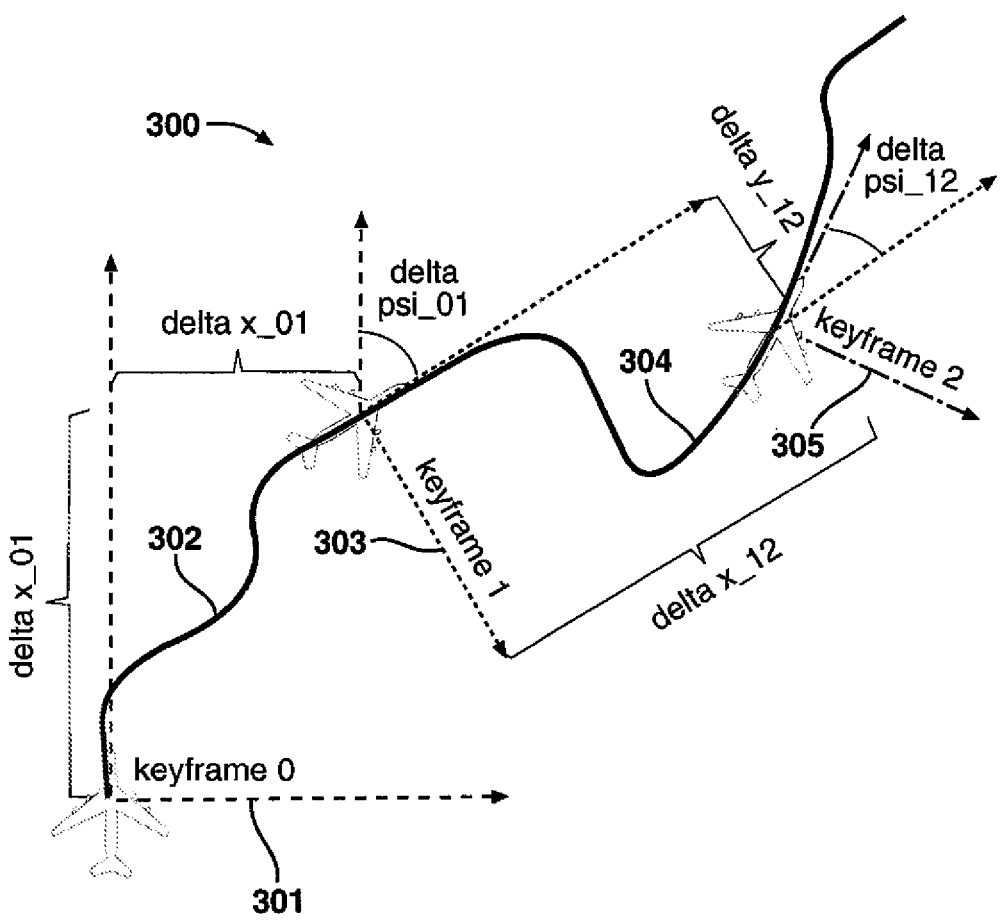
FIG. 3 is a schematic illustration of delta pose measurement generation that are the consequence of setting successive keyframes and then tracking motion with respect to the most recent keyframe.

FIG. 3 represent the generation of delta pose measurements that are the consequence of setting successive keyframes and then tracking motion with respect to the most recent keyframe. An initial keyframe (keyframe 0) 301 is set, defining a local reference frame at the position and heading of the vehicle at time t=0 (i.e., X=0, Y=0, psi=0) The position of the vehicle over time can be tracked 302 with respect to the initial keyframe 301 and when a new keyframe 303 (keyframe 1) is declared, the delta pose is the location of keyframe 1 303 in keyframe 0's 301 reference frame (e.g., delta x from 0 to 1, delta y from 0 to 1, and delta psi from 0 to 1). This delta pose can be recorded as the new keyframe is set and as the vehicle continues to move, its position and orientation can now be tracked with respect to the most recent keyframe, keyframe 1 303, again with an initial position of 0 x, 0 y, and 0 psi (heading) along its path 304. When the third keyframe 305 (keyframe 2) is set, the delta pose from keyframe 303 to keyframe 305 is similarly recorded, with the process repeating to generate a sequence of delta poses, the concatenation of which will provide the position of the subsequent keyframes with respect to keyframe 0's reference frame (see FIG. 1).

As a single agent moves it runs a filter that is tasked with estimating its body frame velocities and its current roll and pitch, as well as its change in position and heading since a recent key frame was established. When some criterion has been met, the front-end delta-pose filter will publish its change in position/heading (with a covariance) and reset its position and heading states to zero, effectively creating a new keyframe. This process will continue with generating and publishing its sequence of delta-poses.

By way of example and not limitation, an illustrative representation of the concept would be a group of ground vehicles each of which is equipped with a navigation system, an extended Kalman filter (EKF), capable of estimating its north and east positions, its body frame velocities, and its heading (with respect to north). They receive accelerations and angular rate measurements from an inertial motion unit and propagate that data in the usual way and take measurements such as position or orientation in the usual way. (Note—this is a simplified 2D system, but is representative of more complex 6 degree of freedom navigation systems that carry significantly more states).

The vehicle' EKFs are then modified to track delta poses as previously described, in this case, they simply integrate their body frame velocities and change in heading to estimate both global states and the pose in the most recent keyframe. To do this, for this specific example, the EKF now tracks eight states instead of the nominal 5.

For convenience, they reset keyframes every second on the second, and share across the network their change is position and heading since the prior keyframe, which would be a compact 3×1 delta state, and a 3×3 covariance (if we share off-diagonal terms). If they are able, they also take a range measurement between cooperating vehicles, also on the second, to match with the poses generated by their delta-pose measurements (delta poses are easily indexed by vehicle ascending count of delta poses, and the range measurement can be indexed with the delta poses it is associated with). After a few seconds, a group of agents, having shared recent delta poses and taken occasional range measurements would have sufficient data to generate a pose graph similar to FIG. 2.

If vehicle 1 gets a global measurement, e.g., a GPS position (assume it is also on the second for simplicity, but all that is needed is the vehicle keyframe when it gets the measurement), then vehicle 1 can update its own global states (careful not to update the delta pose it is about to share) in the usual way. Then vehicle 1 can share the GPS measurement (2×1 and 2×2) along with the most recent delta pose estimate leading to the keyframe the GPS measurement was received.

Those vehicles now solve the batch optimization in order to estimate the relative position of vehicle 1 with respect to their current pose, and use that relative position (and uncertainty) like a lever arm to directly ingest vehicle 1's GPS measurement in their navigation filter, which will directly update their global state estimates and uncertainties.

Effectively, the other vehicles pretend they have a GPS receiver, or similar, on a very long boom (a boom that happens to be the relative position between vehicle N and vehicle 1) in order to benefit from the globally measurement of vehicle 1. When vehicles know the relative position very accurately, they receive a strong update in their global filter states by using the GPS input. When the relative position is less well known (due to bad geometry, less vehicles, limited ranging data, or missing delta pose information), they benefit less from the GPS measurement, just as they would if they had a sensor on a boom where they were less confident in the exact size and shape of their sensor boom.

This approach can be used for a wide variety of applications and sensor aiding sources, e.g., GPS, laser altimeter, TERCOM, vision, magnetic, RF, etc., and can dramatically improve navigation performance when compared to individual navigators, especially with lower quality sensors, ideally reducing the overall system cost without sacrificing overall navigation performance.

Finally, depending on complexity of the communication network and its expected robustness, prioritization of which data to share and in what order may differ. Similarly, the frequency and reasons to reset keyframes may vary and if desired, filters can keep a series of delta pose estimates to better track correlation for use in the batch optimization process. Further, the specific states kept (e.g., body vs. global frame velocities) will change specific implementation details, and possibly the quality of estimates or covariance representations. There is flexibility in the use of a filter, EKF or otherwise, or a sliding batch implementation of the global estimator, or even combining a sliding batch global with the cooperative batch optimization. But, the fundamental concept remains; generate delta pose estimates that can, at least occasionally be linked with inter-agent ranging measurements or observations of common features, and share broadly across participating vehicles. Solve the relative pose of all the vehicles to inform guidance and control algorithms and to enable a straightforward use other vehicles global navigation aiding measurements if/when they are received and shared. This generalized operational data flow is described in FIG. 4.

Figure 4:
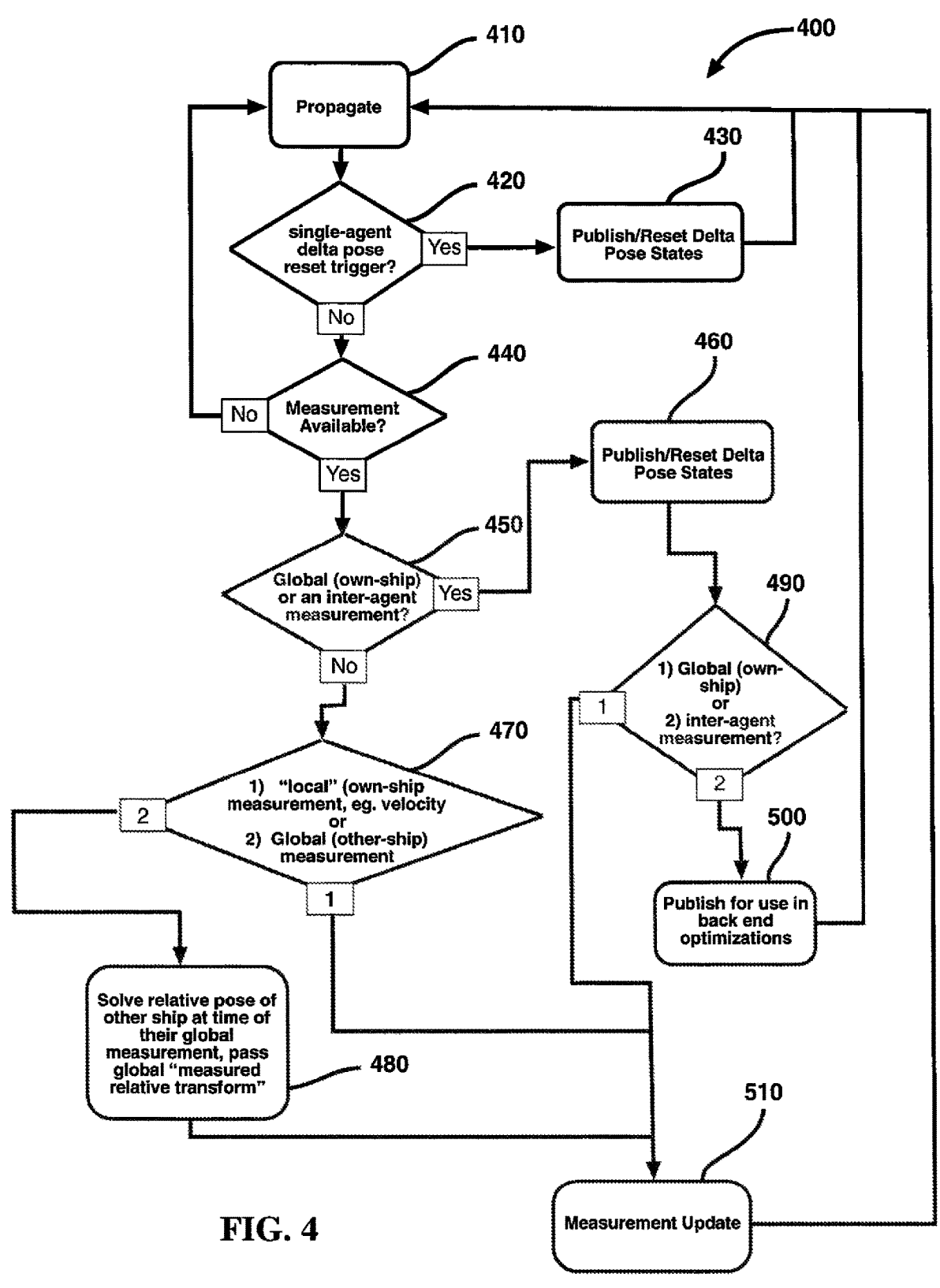
FIG. 4 is an operational flow chart according to one embodiment of the present disclosure.

Referring now to FIG. 4 an operational flow chart 400 according to one embodiment of the present disclosure is illustrated. At Step 410, a vehicle propagates positional information. Query 420 determines whether a single agent delta pose requires a reset trigger. If the answer to Query 420 is yes, then the delta pose state is published or reset at Step 130 and then loops back to the initial Step 410. If the answer to Query 420 is no, then Query 440 determines whether data or sensor measurement is available. If the answer to Query 440 is no, then the process is directed back to step 410. If the answer to Query 440 is yes, then the process moves to Query 450 where a Global (own vehicle) or inter agent measurement is searched for. If global data or inter agent measurement is available, then the process moves to step 460 where the delta pose is published and/or reset. If global data or inter agent measurement is not available, then the process moves to Query 470. At Query 470 the process determines 1 whether a local measurement from the own agent such as velocity is available. If so, the measurement is updated at step 510. Alternatively, At Query 470 the process determines 2 whether a global measurement from another ship is available. If so, the process moves to step 480 where the relative pose of the other ship is determined at the time of their global measurement and then moves to step 510.

Moving back to query 450, if the answer is "yes" then the process moves to step 460 where the delta pose state is published and reset. At query 490 global (own ship) 1 or inter-agent measurement 2 is determined. If global data is determined the process moves to step 510 where the measurement is updated. If inter-agent measurement 2 is determined, then the process moves to step 500 where the information is published for use in back end optimizations and then returns back to the propagate step 410.

In one aspect the present disclosure includes a navigation system for a vehicle without full GPS guidance, comprising: a control system operable for controlling movement of the vehicle; a modified navigation filter operable for generating delta-pose measurements of the vehicle and using globally relevant measurements of a cooperating vehicle; a communication system operable for transmitting and receiving data to and from other vehicles in a defined region; and wherein the system solves for the relative position and orientation of the vehicle and the cooperating vehicles.

In refining aspects of the system, the filter is operable for estimating at least one of a position, a velocity, and an attitude along with a corresponding covariance uncertainty in a global reference frame; at least one sensor operable for providing input data to the filter; wherein the input data is used to propagate vehicle state estimates and to update the vehicle state estimates; wherein the filter further estimates delta-pose states of the vehicle with respect to a local keyframe; wherein the filter is operable to reset the local keyframe and publish a new keyframe position and orientation and uncertainty with respect to a prior keyframe to define an estimate of the delta-pose of the vehicle; wherein the filter is operable for providing a plurality of delta-pose estimates of the vehicle determined from a plurality of data inputs; wherein the filter is operable to estimate a cross correlation of a current position and attitude relative to the current keyframe and prior delta-pose estimates; wherein the filter is operable to receive a globally relevant measurement and an uncertain lever arm and/or relative attitude with a covariance to update an estimate of vehicle position, attitude, and velocity; further comprising a multi-vehicle batch optimization system that uses inter-vehicle ranging and delta-pose measurements for the shared delta-pose measurements to solve some or all of the relative position, velocity, and attitude between cooperating vehicles; wherein the back end batch optimization system provides relative pose estimates, the position and attitude of any pose in any other keyframe pose and an uncertainty in the relative pose estimate; wherein the communication system includes a communication protocol supporting data generation and data sharing between vehicles; wherein the communication protocol determines when to reset keyframes based on the data that other vehicles have transmitted current network connectivity; wherein the communication protocol further determines which data to share and a priority order of that data; and wherein the vehicle is at least one of an aircraft, a watercraft and a terrestrial vehicle.

In another aspect the present disclosure includes a method for improving navigation of a vehicle with limited GPS input, comprising: controlling movement of the vehicle; transmitting and receiving data to and from other vehicles in a defined region; and generating delta-pose measurements of the vehicle with a navigation filter; transmitting and receiving data to and from other vehicles in a defined region; solving for the relative pose of other vehicles with respect to a resent keyframe; and using globally relevant measurement and relative pose of at least one other vehicle to improve the accuracy of the navigation filter While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A navigation system for a vehicle without full GPS guidance, comprising:
   a control system operable for controlling movement of the vehicle;

a modified navigation filter operable for generating delta-pose measurements of the vehicle and using globally relevant measurements of a cooperating vehicle;
   a communication system operable for transmitting and receiving data to and from other vehicles in a defined region; and
   wherein the system solves for the relative position and orientation of the vehicle and the cooperating vehicles; and
   wherein the filter is operable for estimating in a global reference frame at least one of a position, a velocity, and an attitude along with a corresponding covariance uncertainty.

2. The system of claim 1, further comprising at least one sensor operable for providing input data to the filter.

3. The system of claim 2, wherein the input data is used to propagate vehicle state estimates and to update the vehicle state estimates.

4. The system of claim 1, wherein the filter further estimates delta-pose states of the vehicle with respect to a local keyframe.

5. The system of claim 4, wherein the filter is operable to reset the local keyframe and publish a new keyframe position and orientation and uncertainty with respect to a prior keyframe to define an estimate of the delta-pose of the vehicle.

6. The system of claim 4, wherein the filter is operable for providing a plurality of delta-pose estimates of the vehicle determined from a plurality of data inputs.

7. The system of claim 4, wherein the filter is operable to estimate a cross correlation of a current position and attitude relative to the current keyframe and prior delta-pose estimates.

8. The system of claim 1, wherein the filter is operable to receive a globally relevant measurement and an uncertain lever arm and/or relative attitude with a covariance to update an estimate of vehicle position, attitude, and velocity.

9. The system of claim 1, further comprising a multi-vehicle batch optimization system that uses inter-vehicle ranging and delta-pose measurements for the shared delta-pose measurements to solve some or all of the relative position, velocity, and attitude between cooperating vehicles.

10. The system of claim 1, wherein a back end batch optimization system provides relative pose estimates, the position and attitude of any pose in any other keyframe pose and an uncertainty in the relative pose estimate.

11. The system of claim 1, wherein the communication system includes a communication protocol supporting data generation and data sharing between vehicles.

12. The system of claim 1, wherein the communication protocol determines when to reset keyframes based on the data that other vehicles have transmitted current network connectivity.

13. The system of claim 1, wherein the communication protocol further determines which data to share and a priority order of that data.

14. The system of claim 1, wherein the vehicle is at least one of an aircraft, a watercraft and a terrestrial vehicle.

15. A method for improving navigation of a vehicle with limited GPS input, comprising:
   controlling movement of the vehicle;
   transmitting and receiving data to and from other vehicles in a defined region; and
   generating delta-pose measurements of the vehicle with a navigation filter;
   processing global inputs with the navigation filter;

transmitting and receiving data to and from other vehicles in a defined region;

solving for the relative pose of other vehicles with respect to a resent keyframe; and using globally relevant measurement and relative pose of at least one other vehicle to improve the accuracy of the navigation filter.

* * * * *